July 2, 1957
L. J. MOULTON
2,797,913
HYDRAULIC SPEED GOVERNOR WITH SOLENOID FORCE ACTING ON ITS PILOT VALVE
Filed Oct. 5, 1953
3 Sheets-Sheet 1
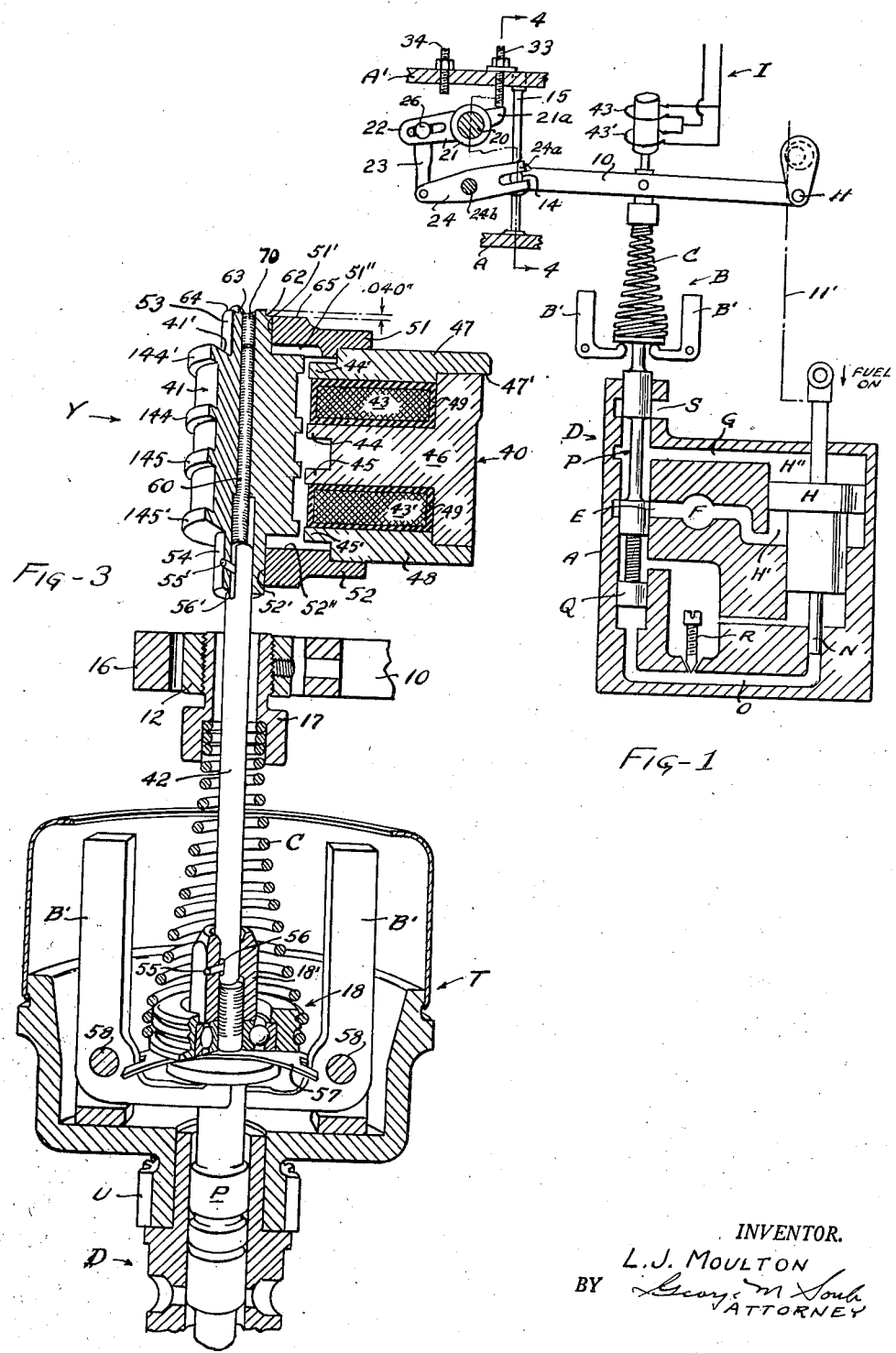
INVENTOR.
L. J. MOULTON
BY George M Soule
ATTORNEY

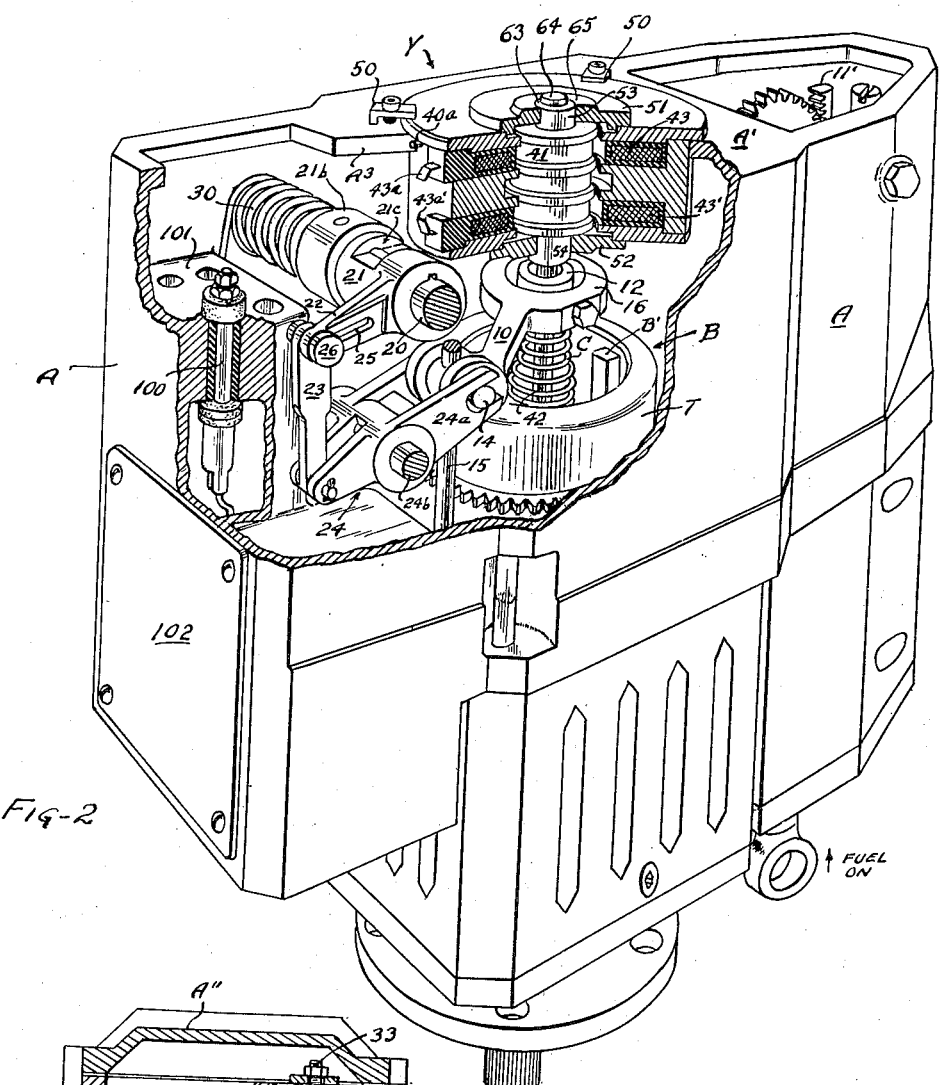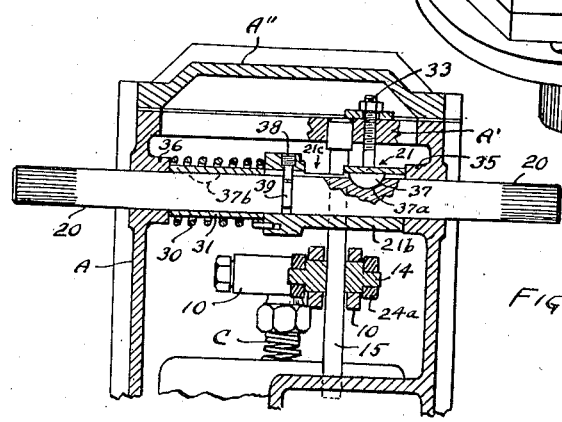

INVENTOR.
L.J. MOULTON
BY George M. Soule
ATTORNEY

United States Patent Office 2,797,913
Patented July 2, 1957

2,797,913

HYDRAULIC SPEED GOVERNOR WITH SOLENOID FORCE ACTING ON ITS PILOT VALVE

Lloyd J. Moulton, Mentor, Ohio, assignor, by mesne assignments, to Curtiss-Wright Corporation, Marquette Metal Products Division, Cleveland, Ohio, a corporation of Delaware Application October 5, 1953, Serial No. 384,255

13 Claims. (Cl. 264—3)

The invention relates to hydraulic speed governors for internal combustion engines and the like, and particularly to improvements in speed setting mechanisms for such governors for enabling variable adjustment of engine speed through remote control by magnetic force variation applied as counterpoise to centrifugally acting engine speed change detectors of the governors. The invention also involves selective speed setting of hydraulic governors, via their usual flyweight and pilot valve mechanisms, interchangeably by application of variable magnetic counterpoise force normally unaccompanied by mechanical motion and variable mechanical counterpoise force accompanied by mechanical motion, each without possibility of interfering with the proper functioning of the other and correlated for matched performance throughout any desired working load-speed range of engine operation.

Since the magnetically operating speed setting mechanism components and the mechanically acting components involved in detecting and correcting speed error (hydraulic governor components proper), have, as a practical matter, to be separately assembled respectively into properly working electrical and mechanical units, suitable gauging and adjustment means for verifying and/or effecting precise co-ordination during final assembly and trial operation must be provided in order to offset or compensate for the necessary manufacturing tolerances particularly in respect to the governor components which are necessarily numerous. Additionally, so far as possible, since the forces and motions involved in speed setting and speed error detection are relatively small, all deleterious effects of friction and unwanted magnetic bias in the governor mechanism generally must be minimized for the sake of high sensitivity.

The presently disclosed governor mechanism has been developed to fulfill, among others, the objectives and requirements outlined in or indicated by the foregoing. Other special objectives and/or novel features claimed herein will be made apparent from the following description of the herewith illustrated embodiments of the invention. In the drawings:

Fig. 1 is a schematic view showing the principal elements and fluid circuit of a hydraulic governor and with the two types of speed setting means discussed above.

Fig. 2 is a sectional perspective view of the governor with its cover and other portions removed to show the principal speed setting parts and assemblies.

Fig. 3 is a relatively enlarged sectional assembly view, partly in perspective, showing the governor speed weighing mechanism and associated parts.

Fig. 4 is a fragmentary sectional view, taken in a vertical plane approximately as indicated at 4—4 on Fig. 1.

Figure 5:
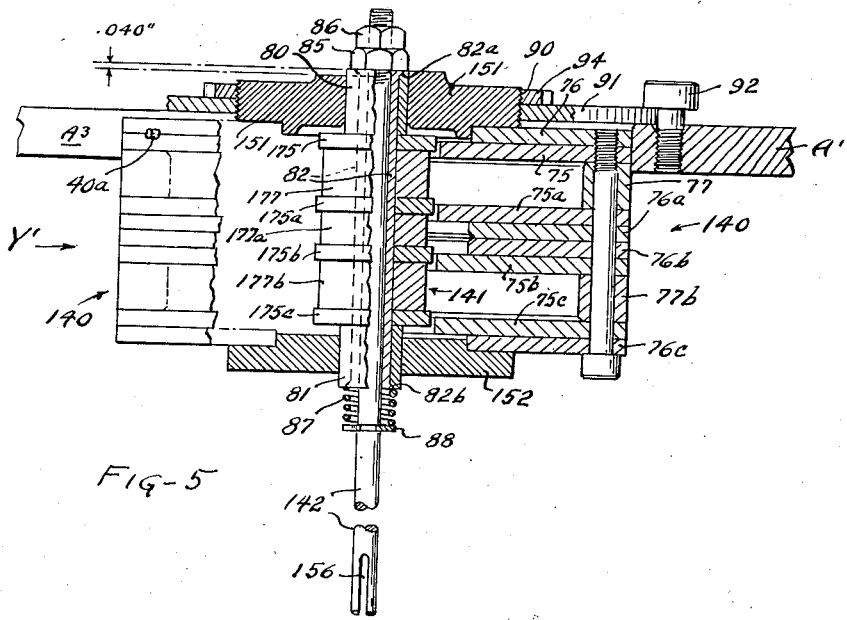
Fig. 5 is a fragmentary sectional view somewhat similar to Fig. 3 and showing a modified electrical speed setting means.

The hydraulic governor, as shown in Figs. 1 and 2 has a casing A, containing an engine-speed-change-detector or speed weighing mechanism B with flyweights B', a speeder spring C and a pilot valve D the movable part of which is valve plunger P. The pilot valve D controls the operating effect of substantially constant pressure fluid (governor oil as from a pump and accumulator, not shown, admitted by line or passage F) on a servomotor, represented by power piston H and its cylinder. Passage F is continuously connected to the cylinder space or pressure chamber H' of the servomotor, and passage G connects the pilot valve with the cylinder chamber H''. Governor oil, in the illustrated equilibrium or neutral position of the pilot valve is trapped by that valve in line G in contact with a relatively large effective area of the power piston H whose smaller effective area is continually subjected to governor oil pressure through line F.

To cause "fuel-on" movements of the power piston H (upward movement in the governor depicted by Fig. 2, downward in the schematic showing per Fig. 1) the pilot valve plunger (by lowering as in response to diminished engine speed, thus opening port E) admits governor oil through passage G to the cylinder chamber H'' of the power piston; and, to cause "fuel-off" or reverse piston movements, the pilot valve plunger P is moved to spill trapped oil from said chamber H'' at pilot valve sump connection port S.

A hydraulically acting feedback (temporary speed droop or "compensation") system between the governor power piston H and its pilot valve D is diagrammatically represented in Fig. 1 as comprising an actuating displacement pump N; oil passage O; receiving piston Q which is spring-connected to the pilot valve plunger P, and a needle valve R for reset rate adjustment. The system is substantially that of A. Kalin Patent 2,219,229, dated October 22, 1940.

As in the Kalin patent just above mentioned, and for the purpose of minimizing friction restraint on governor flyweight action, provision is made to maintain, during governor operation, the pilot valve plunger and compensation fluid receiving piston assembly in rotation relative to the guide bores for the plunger and piston. The governor ball head casing T, Figs. 2 and 3, hence the flyweights B', are continuously rotated by a governor drive shaft connected gear (not shown) in mesh with teeth U on the ballhead casing; and the flyweight assembly is connected to the pilot valve plunger in a manner to cause the plunger and piston Q to turn with the flyweight assembly at all speeds.

For speed adjustment or setting of speeder spring force manually, or by suitable motor means not shown, a generally horizontal floating lever 10 extends from a pivotal supporting means or fulcrum 11 (fulcrum automatically movable as a function of governor power piston movement, as through toothed rack 11', for permanent speed droop), and the lever is connected with the speeder spring C through a rocker collar 12 pivotally carried by the lever. Beyond the rocker collar, to the left, Figs. 1 and 2, the floating lever 10 is connected to a pivot block 14, Figs. 2 and 4, which is guided for vertical movement in the governor case A on a fixed rod 15 suitably mounted in the case as best shown in Fig. 4. Rocker collar 12 has a trunnion mounting on a rigid ring or yoke portion 16 of the lever 10, and the collar 12 carries a threaded sleeve 17 (speeder plug) for connection to the upper end of the speeder spring C. The lower end of the speeder spring C is connected to the pilot valve plunger P by an antifriction bearing assembly 18 the construction of which is made apparent in Fig. 3. A magnetic speed setting force transmitting rod 42 extends through the sleeve 17 and the speeder spring C, as will be described later; and the vertical guide rod 15 co-operates with the fulcrum 11 in so guiding the floating lever 10 as always to maintain the speeder spring and sleeve 17 out of contact with the rod 42.

For operating the floating lever 10 to set the speeder spring force through a complete speed range, a rock shaft 20 journalled in the governor case, is connected to the lever 10 as evident from comparison of Figs. 1, 2 and 4. The range of movement of speed setting mechanism or linkage (not illustrated) which lies outside of the governor (and which, incidentally, may be quite massive and involve large operating force application) determines the angular movement of rock shaft 20 in setting speed over the desired range. An adjustment means is necessary or desirable between the rock shaft 20 and speeder spring C in order properly to proportion the externally determined rock shaft movement to different amounts of movement which may be required by the speeder spring for governor operation over such range. The rock-shaft-operated linkage mechanism comprises, as shown, a lever member 21 tightly secured to the rock shaft 20 and having an arm 22 connected by a link 23 to one of two double arms of a rocker lever 24, shown beneath the rock shaft 20, the other double arm, 24a, of said rocker lever 24 being straddle-connected to the floating lever 10 through the pivot block 14 earlier referred to and as clearly shown by comparison of Figs. 2 and 4. Pivot shaft 24b of rocker lever 24 occupies a fixed position. The motion-proportioning adjustment earlier mentioned in this paragraph is enabled by selective positioning of the upper end of link 23 along a slot 25 of lever arm 22 and by locking of the link in adjusted position through a connecting pivot bolt 26, of known type, secured to the link.

The above described speed setting mechanism (parts 10 through 26) is arranged to provide a precisely adjustable starting speed for the engine without requiring manipulation or operation of the rockshaft 20 or energization of solenoid force couple Y. For that purpose rockshaft 20 of the mechanism is yieldingly biased (principally by a torsion spring 30 around the rockshaft, acting thereon through abutment of one arm of the spring with lever member 21) against a readily adjustable low speed stop screw 33 (Figs. 1 and 4 only) carried by governor casing bridge portion A' or the like and rendered easily accessible when the governor case cover A", Fig. 4, is removed. Torsion spring 30 is needed to augment the upward force of the speeder spring C on floating lever 10, to overcome friction and other restraining forces in the operating linkage, since the speeder spring force is, of course, relatively small at low speed setting. Low speed stop 33, as shown, is a screw which abuts an arm 21a, Fig. 1, on lever member 21. A similar high speed stop screw 34 is also indicated as mounted on the governor case bridge portion A', in position for abutment with arm portion 22 of said lever member 21. Since the stop screws 33 and 34 act, in effect, directly to arrest movement of the rockshaft 20, the strains to which the illustrated linkage parts could otherwise be subjected when the stop elements become effective are definitely limited.

Rock shaft 20, as shown in Fig. 4, is of generally uniform diameter and is similarly formed at each end so that the shaft can occupy either of two end-for-end, relatively reversed, positions in the assembly. The hub or main body portion 21b of lever member 21 (cf. Fig. 2) forms with a mounting sleeve 31 for torsion spring 30 a spacer sleeve assembly between boss portions 35 and 36 of the governor case A which support the rock shaft. A key 37, shown in Fig. 4 as occupying one of two identical keyways or mating slots 37a and 37b in the shaft positively secures the lever member 21 against turning relative to the rock shaft, and endwise movement of the rock shaft out of working position is prevented by a locking screw 38 in lever member 21 the inner end of which screw enters a circumferential groove 39 in the shaft. During assembly the key 37 is inserted into its keyway while the latter is opposite a window opening 21c formed in the top side of lever member 21. The keyway is rendered accessible for insertion of the key through the window when the shaft is displaced axially to the left a short distance from the illustrated (Fig. 4) working position of the shaft. When the shaft 20 with its key 37 has been slid into the illustrated final position, the screw 38 is then set into the groove 39 of the shaft.

Referring especially to Figs. 2 and 3, the preferred magnetic speed setting mechanism involving flyball force reactance independently of speeder spring movement (acting in parallel with the speeder spring in the disclosed arrangement) comprises a self contained solenoid and armature assembly Y, hereinafter usually called solenoid force couple. The solenoid comprises coil and field structure unit 40 of couple Y supported in fixed position on the governor case A (on bridge portion A' of the case, as shown) in operative axial alignment with the governor ballhead or speed weighing mechanism B. The bridge A' has a guiding generally circular bore which snugly receives the unit 40 and which is in accurate alignment with the governor pilot valve plunger receiving bore. The armature 41 must have a precisely adjusted normal working position (assuming governor operation at equilibrium, the illustrated condition) wherein (through the intermediary of a solenoid force transmitting push rod 42, which also serves as a drive shaft for the armature for purposes to be explained later) variable magnetic downward biasing force on the armature by the solenoid acts, with positive rate or scale, in a direction to counterbalance the centrifugal force of the flyweights. The armature 41 is temporarily moved upwardly out of its illustrated normal working position by the flyweights during overspeeding of the ballhead; but the permitted upward movement of the armature is limited, by means to be described, to such extent that the necessary magnetic counterpoise force for stability of governor action during speed error correction will always be maintained. Solenoid force couple Y, with appropriate means (not shown) for varying current to its coil or coils, is capable of serving as the sole means for setting speed.

Referring to solenoid field structure unit 40, this comprises coils 43, 43' and an enclosing duplex magnetic flux assembly providing two pairs of annular magnetic pole portions 44, 44' and 45, 45' in relatively opposed position magnetically (e. g. portions 44 and 45 both always south poles when the coils are energized), to minimize stray magnetic field effects in the governor. Fig. 1 shows the coils connected to an energizing circuit 1 in parallel, as one example. They can of course, be series connected (not illustrated). There can be a larger or smaller number of coils than are illustrated, variously tapped as required by input signal apparatus functions. Central field member 46 of generally cylindrical form, providing the magnetic pole elements 44 and 45, is clamped by suitable bolts, not shown, between pilot-shouldered circular flux path affording end plates 47 and 48 which have, respectively, the magnetic pole portions or elements 44' and 45'.

The armature 41 of magnetic material such as soft iron has annular pole portions in the form of ribs 144, 144', 145, 145' (Fig. 3 only) which very accurately match in relative position and width the more or less correspondingly referenced pole portions or elements 44 etc. of the field structure. All the pole portions of armature and field structure are formed with sharp edges for uniformity of flux path or so that the various annular air gaps between coacting pole portions will be as nearly uniform as possible.

Except for the necessary electrical terminal leads (see Fig. 2 wherein two leads 43a 43a', one from each coil, are partially shown), the coils 43, 43' are completely embedded in moulded plastic envelopes 49 which approximately fit the illustrated annular spaces provided by the assembly comprising magnetic field members 46, 47 and 48. Top field end plate member 47 of solenoid unit 40, in the arrangement according to Figs. 2 and 3, overhangs the field member 46, as at 47' to provide a shoulder for engagement with the top of governor case bridge portion A' (Fig. 2), and the unit 40, as shown, is held in place by readily removable clips 50 supported on said bridge portion A'. A pair of stops 40a (one shown in Fig. 2) are so located on the field structure unit 40 as to abut associated spaced apart portions A3 of the governor case bridge portion A' and insure proper placement of the unit 40 into the governor so that the coil leads are rendered readily accessible for making the necessary electrical connections therewith.

In order to simplify external electrical connections to the coil units (comprising coils 43, 43' and their plastic envelopes 49) the pairs of leads 43a and 43a' in the respective units have conventional uniform relationship to the direction of winding of associated coils, whereby the persons who make the connections can be certain that the earlier herein described magnetically opposed relationship of field pole pairs will obtain in each installation. The coils 43 and 43' are supplied with current through (e. g. four) insulated terminal posts, one being shown at 100 in, Fig. 2 (jumpers omitted), extending through the apertured top wall 101 of an oil-excluding compartment portion of the governor case which forms a terminal box having a removable cover panel 102.

For supporting the armature 41 accurately and rotatably in operating position in the solenoid field structure unit 40, top and bottom bearing members 51 and 52 of non-magnetic material, such as bronze, are accurately made and pilot fitted and/or dowelled to the field plates 47 and 48 respectively; and the bearing members have accurately aligned smoothly finished bores 51' and 52' which receive and guide reduced diameter cylindrical journal or trunk portions 53 and 54 of the armature 41.

The solenoid force couple Y is so designed as to apply appropriately increasing flyweight counterpoise force, via the armature 41, as the flyweights move outwardly from equilibrium position in detecting over-speed errors and through whatever distance of free flyweight movement is required for effectual governor action. Since there are inherent critical limits to the amount of displacement of the armature 41 out of magnetic neutral position (coacting pole portions aligned) beyond which increasing magnetic force with increased armature displacement from its normal or working position occurs, it is important that upward armature movement beyond the normal working position be definitely limited. In the present arrangement the under or inner face 51'' of the upper non-magnetic bearing member 51 forms a stop for abutment by an associated axially facing shoulder surface 41' of the armature 41 for preventing displacement of the armature beyond the effective operational limits of the magnetic flux circuit of solenoid force couple Y. The surface 41' of the armature advantageously defines one side of the upper pole-forming rib 144' of the armature, so that an armature-position-indicating axially exposed gauging surface of the armature (described later) will not have to be accurately related to two different reference surfaces of the armature, such as would be the case if surface 41' were to be formed on a special step.

So long as the solenoid coils 43, 43' of element Y are energized, the armature 41, during underspeed detection and correction by the governor, is magnetically arrested in its magnetic neutral position. When during governor operation the coils 43, 43' are not energized and underspeed error occurs then the top face 52'' of the lower non-magnetic bearing member 52 can abut the bottom end of the armature proper and prevent withdrawal of the upper journal portion 53 of the armature to any considerable extent out of its co-operating guide bore 51' in bearing member 51.

During governor operation, the armature 41 is substantially relieved of restraint by friction (so that the solenoid force element Y will not interfere with freedom of governor flyweight and pilot valve action) by provision for maintaining continuous relative rotation between the journal portions 53 and 54 of the armature and their bearing bores 51' and 52'. Due thereto, if the solenoid and armature couple is slightly magnetically unsymmetrical, either through slight relative eccentricity of field and armature poles or non-uniformity of magnetic flux path materials used in the construction, any resulting detrimental effects in bearing loading will not be statically concentrated at any particular portions of the coacting bearing or guide surfaces. The journals 53 and 54 (being soft iron in the form illustrated in Fig. 3) are preferably chrome plated to resist wear.

For maintaining the journal portions 53 and 54 of the armature 41 in rotation relative to their guide bores in the bearing members 51 and 52 (see Fig. 3) the push rod or drive shaft 42 is, in effect, keyed to a continuously rotating part of the ballhead B and to the armature. As shown, the lower end of rod or shaft 42 has a pin and slot drive connection 55, 56 with a retaining nut 18' of bearing assembly 18 and a similar pin and slot drive connection at 55', 56' with the armature. The rod or shaft 42 slides freely in the center bores of nut and armature. The nut 18' is screwed tightly to the upper end of the pilot valve plunger P. Maintenance of rotation of the pilot valve plunger and the rest at all speeds is insured by provision of a drive yoke 57 (Fig. 3 only) which is clamped in place on the pilot valve plunger as clearly illustrated. Slotted ends of the yoke loosely embrace the flyweights near their pivotal connections 58 to the ball head casing. The lower end of the rod or shaft 42 always rests on the top end of the pilot valve plunger P, and the armature 41, through an adjustment screw 60 thereof, to be described later, normally rests on the top end of said rod or shaft. The upper end of the slot 56' in the rod or shaft 42 is open axially, as shown, to enable the solenoid force couple Y to be assembled into and removed from the governor casing as an independent unit. The slot 56 in the lower end of rod or shaft 42 may be downwardly open (not so shown in Fig. 3).

When the solenoid force couples Y are assembled into their governors, manufacturing tolerances of governor and/or solenoid force couple components cause positional variations between the speed weighing elements of the governors and the solenoid force couple elements which may deviate from the positional relationship which is required for satisfactory magnetic force generation. It is therefore necessary to provide verification testing means and means to effect precise final adjustment between the solenoid armature (and/or the solenoid field structure unit) and the speed weighing mechanism of the governor in order accurately to position the armature with relation to the field structure when the speed weighing mechanism is in an operating equilibrium condition.

The mechanisms disclosed hereby include two general methods of arranging for minute step by step or precision axial adjustment between the solenoid force couple Y and the speed weighing means of the governor. These methods are not necessarily alternatives. One can supplement the other (one for trial installation and the other for trimming during governor operation). In both Figs. 3 and 5 means are provided whereby the minute step adjustment is performed along and close to the operating axis of the solenoid force couple and physically between the armature 41 (or 141) and the flyweight and pilot valve assembly. Fig. 5 also shows a convenient or readily accessible arrangement whereby minute step or precision adjustment of the field assembly 140 of the solenoid with reference to the governor pilot valve and the rest can be performed during governor operation by movement of said field assembly in mounted position on the governor casing. Easily accessible coacting gauging surfaces related to pole portions of associated couple elements according to the distance between the magnetic neutral relative position of said elements and their working relative position during equilibrium operation of the governor are, in each and every case, so arranged that when the gauging surfaces register or are found to be out of register certain amounts, that definitely indicates the proper or improper positional relationship between the solenoid force couple elements and the speed weighing means of the governor (e. g. pilot valve thereof, hence also the flyweights) after said couple has been assembled into the governor and tested for position with the governor ball head rotating at a suitable fixed speed and with the pilot valve in neutral or non-valving or equilibrium position.

For a given solenoid design and energizing range thereof it is fairly easy to determine the required amount of armature displacement out of its magnetic neutral position which will afford the desired magnetic axial thrust values for the desired flyweight counterpoise action throughout such range. Assuming the required displacement (distance $x$ for reference or discussion) is .040″ in a typical case or for the illustrated governor arrangement, this distance, indicated at the top of Fig. 3 (cf. Fig. 5), can, as one solution, be represented by the height or axial length of a step formed as at 62 between axially exposed, hence readily accessible, concentric gauging end surfaces 63 and 64 of the upper armature journal portion 53 and a coacting gauging surface 65 on bearing member 51.

Figure 6:
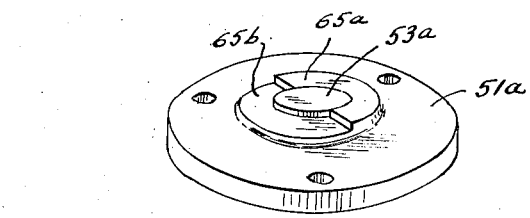
Fig. 6 is a fragmentary perspective view showing one specific form of relative position indicator and gauging means hereof in respect to electrically and mechanically operating components.

As an operating equivalent of the arrangement just above described, at least for verification test purposes, there is shown in Fig. 6 relatively axially offset or end stepped gauging surfaces 65a and 65b on the exposed upper end of the non-magnetic bearing member 51a, in which case a single flat gauging surface 53a is formed on the top end of the armature journal portion. This particular arrangement (Fig. 6), facilitates determination of correct or incorrect relative positioning of armature and field poles (magnetic neutral indication) after assembly of unit Y and trial energization of the coils simply by feeling sense, as in the use of a flush pin gauge, since the coacting pair of gauging surfaces (53a—65b flush in this case) are directly adjacent to each other. Thus the Fig. 6 arrangement enables verification-testing by feel of an operator's finger as to both pairs of coacting indicator or gauging surfaces whereas, in the Fig. 3 arrangement, ascertainment of the correct magnetic neutral relative position of armature and field (surfaces 63 and 65 then coacting and in alignment) require use (e. g.) as a sight gauge. Testing can, for example, be done by using a non-magnetic straight edge in the case of surfaces 63 and 65, Fig. 3. Since the more important verification testing, as by use of the gauging surface couple 64—65, Fig. 3 (feel or sight) is performed with the armature 41 rotating, it would not be practicable to provide an end step on the top surface of the armature journal portion (hazardous to operator).

The two concentric step surfaces 63 and 64, Fig. 3, are accurately located, by precision manufacture and inspection, the required distances from the various armature pole forming ribs. Then, assuming that the top surface 65 of non-magnetic bearing member 51 in solenoid field assembly 40 is similarly accurately located the same distance from the field poles 44, 45 etc. as the armature journal surface 63 is above the corresponding armature poles, it is apparent that, with the armature in its magnetic neutral position, the top armature gauging surface 63 will be transversely aligned (i. e. flush) with bearing surface 65. Similarly (after installation of the solenoid force couple unit Y into the governor), when, during governor operation at equilibrium the step surface 64 is found to be flush or transversely aligned with the bearing surface 65 it will be known that the proper armature displacement for the necessary magnetic force generation obtains. Location and operation of gauging surfaces in the Fig. 6, end stepped surface arrangement are, of course, obtained and effected in essentially the same manner as just above described.

The threaded adjusting screw 60, in the arrangement according to Fig. 3, is of magnetic material, hence the screw serves to advantage to provide part of the armature flux path, and the thread pitch is preferably selected so that an easily judged angular movement of the screw by a suitable tool will result in axial relative adjustment of armature and field poles readily measurable and usable fractions of distance "$x$" (the .040″ as given above). For example a 10–32 screw requires one and one quarter turn for .040″ axial movement. The adjustment screw 60 is provided with locking means, shown in the form of a locking screw 70 which is very tightly seated against the adjusting screw after the governor and unit Y assembly has passed the verification test.

In the solenoid force couple arrangement Y' according to Fig. 5 the principal components of the field and armature structure units 140 and 141, for high quantity production and interchangeability of parts, are made and assembled largely from stacked metal members of easily individually measurable dimensions. This greatly reduces the relatively difficult precision machining and inspection operations which are ordinarily required (particularly in respect to the field structure wherein internal forming operations are involved) in order to locate a plurality of close tolerance thickness pole portions accurately in precise predetermined relationship on a single metal blank. The pole and flux path portions of each assembly 140 and 141 are made from a small member of sets of basically identical flat plates and rings, the members of which sets in the finished assemblies differ from others of the same set (if they differ), only by provision of special holes, recesses etc. required for fastening means and for adaptation to other necessary components of the field and armature structures.

In the stacked field assembly 140, as shown in Fig. 5, the pole forming plates, designated 75, 75a, 75b and 75c are basically identical generally circular stampings, as are the auxiliary flux path members 76, 76a, 76b and 76c. Pole spacing flux path members 77 and 77b are identical with each other, being for example incomplete rings (C-shapes) to provide openings for the lead-supporting radial projections of the plastic envelopes 49 (cf. Fig. 3) of coils 43 and 43'. Flux path members 77 and 77b can be cut from tubing or composed of stampings. There are, of course, various suitable ways of holding the stacked field sections together (fasteners mostly omitted from the showing), whereby the annular air-gap-defining pole faces of sections 75, 75a etc. will be accurately and rigidly held in position for matching the corresponding pole faces of the armature.

In the stacked plate armature assembly 141, the mutually identical magnetic pole-forming plates 175, 175a etc. are so related as accurately to register with the corresponding pole-forming plates of the field when separated by flux carrying spacer rings 177, 177a and 177b. The armature journals 80 and 81 are non-magnetic sleeves forming end pieces for the stacked armature assembly all the elements of which are adapted to be held rigidly together by a center tube 82 of magnetic metal. The tube 82 is shown as enlarged at 82a and 82b, as by spinning operations, for tight stack-assembly-clamping abutment with the journal forming sleeves 80 and 81.

The non-magnetic bearing members 151 to 152, Fig. 5, correspond, in function, inter alia, to bearing members 51 and 52 earlier described. Top bearing member 151 preferably has the end stepped, armature position indicating and gauging surface arrangement according to Fig. 6 earlier described herein for co-operation with the exposed end surface of sleeve 80.

The armature drive shaft and push rod 142 of Fig. 5, has a freely sliding fit within the armature-plate-clamping tube 82. The upper end of shaft 142 is threaded to support armature-position-adjusting nut 85, seated upon journal sleeve 80, and a lock nut 86. The shaft 142 is strongly urged downwardly relative to the assembly (to maintain the adjusting nut 85 firmly seated and to insure, by friction, rotation of the armature 141) by a coil spring 87 around the shaft. The spring is supported at its lower end by a shoulder on the shaft (shoulder shown as provided by a snap ring 88), and the upper end of the spring, as shown, reacts against the lower end of journal sleeve 81. Since the upper end portion of the shaft 142 occupies the armature that portion at least should be of magnetic material. Below the armature the shaft 142, advisably, is non-magnetic, as by making the shaft from two suitably joined or flexibly articulated sections (not shown). Since the shaft 142, in Fig. 5, is part of the assembly unit which constitutes solenoid force couple Y' the shaft requires a detachable connection with the governor ball head assembly, hence the illustrated downwardly open slot 156 in the lower end of the shaft for operation as will be evident from the foregoing description.

Fig. 5 further illustrates one manner of mounting the solenoid field structure (e. g. 140) on the governor case (e. g. bridge portion A') so that the precision adjustment, for co-ordinated solenoid force unit action and governor action, can be effected wholly or in part by axial movement of the field. The precision adjustment, thereby (in contradistinction from the Fig. 3 arrangement), can be performed while the governor is operating. As shown, the external periphery of bearing member 151 is screw threaded at 90 for engagement with accurately mating threads of a stiff annular metal plate 91 which extends radially beyond the field assembly 140 and is clamped against the top face of the governor case bridge A' as by a series of circumferentially spaced apart screws 92 (one shown). The lower face of annular plate 91, as the plate rests on the bridge, is permanently spaced apart from the top side of the field assembly proper such distance that said assembly can be either lowered or raised relatively small amounts by turning the annular plate as by a spanner or capstan type wrench. A threaded locking ring or nut is shown at 94 for maintaining the adjustment. Pins 40a, Figs. 2 and 5, or equivalent means prevent the field assembly 140 from turning in its mounting recess of bridge A' when the annular plate 91 is turned in effecting the adjustment; and the fastener screws 92 are only slightly loosened, so that the annular plate will be maintained in contact with its support on the governor case during the adjustment operation.

I claim:

1. In a hydraulic speed governor for engines, wherein a fluid-servomotor-actuating pilot valve plunger is maintained in a neutral position relative to co-operating fluid ports during steady state operation of the governor, an electrical solenoid device including a coil member and co-operating armature member, said members having respective co-operating pole portions defining an approximately constant air gap, one of which members is stationary and the other of which is connected to move the valve plunger axially with forces which vary according to energization of the solenoid coil when said pole portions are in a predetermined working or axial-force-exerting relationship offset from their magnetic neutral or no-axial-force-exerting relationship, said solenoid device constituting a self contained assembly adapted for installation and installed into the governor as a working unit, the governor and unit assembly including means adapted to act on one of said solenoid device members for effecting minute step or high precision relative positional adjustment between the members axially of the device, said solenoid device members having a coacting pair of gauging surfaces exposed axially thereof and axially spaced apart a distance corresponding to said working offset relationship of said pole portions for governor operation at steady state when the coil is energized and the armature is in its magnetic neutral position, whereby, when the coil member and armature member are in properly adjusted axial relationship and the governor is operating at steady state, the gauging surfaces are transversely aligned.

2. The mechanism according to claim 1, wherein the coil member is stationary and the armature member is connected to the valve plunger through the intermediary of an element of fixed length, the armature member having an axial through bore into which one end portion of that element extends and is slidable, and said means for relatively adjusting the solenoid device members comprises adjusting screw means threaded into another portion of said through bore in operating abutment with said fixed length element and being accessible for manipulation at the end of the armature member which has the gauging surface of that member.

3. The mechanism according to claim 1, wherein the coil member is stationary and the armature member is connected to the pilot valve plunger through the intermediary of an element of fixed length, the armature member having an axial bore slidably receiving that element and wherein one end of that element projects from said axial bore of the armature member in a direction away from its point of connection with the valve plunger, spring means connected between the armature member and said element of fixed length and tending to move said element along the bore toward the valve plunger, the means for relatively adjusting the solenoid device members being located on the projecting portion of said element of fixed length and operatively abutting the armature member in a direction tending to oppose the biasing force of the spring.

4. The mechanism according to claim 1, including a stationary mounting means for the coil member and adjusting means connected to act on the coil member while reacting on the mounting means, whereby to enable movement of the coil member axially in minute steps during trial operation of the governor at steady state to bring said coacting pair of gauging surfaces into alignment.

5. The mechanism according to claim 4, wherein the mounting for the coil member is an annular plate concentric with and screw threaded to the coil member, together with clamping means normally operating on the plate to hold it firmly against turning about the axis of the coil member but releasable to enable the plate to be turned for adjusting axial movement of the coil member.

6. In a hydraulic speed governor for engines, wherein a fluid-servomotor-actuating pilot valve element is adapted to be maintained in a neutral non-valving position relative to co-operating fluid ports by relatively opposite balanced forces acting on the valve element, a solenoid device comprising an armature member and a coil member, one member being stationary and the other being movable and connected to the valve element for imparting solenoid magnetic force to the valve element in opposition to one of the aforesaid forces, said members having pole portions co-operating to establish an air gap extending generally parallel to the direction of movement of the movable solenoid device member, said co-operating pole portions having a predetermined critical working or axial-force-exerting relative position along the air gap, adjusting means connected to move one member of the solenoid device relative to the other member in said direction of extent of the air gap and operative to cause said pole portions to occupy said working relative position when the pilot valve element is in its neutral position, and a pair of permanently exposed gauging surfaces on the solenoid device members, which gauging surfaces are so located as to be flush with each other only when the pole portions are in their said working relative position and the valve element is in said neutral position.

7. In a hydraulic speed governor for engines, wherein a fluid-servomotor-actuating pilot valve plunger is maintained in a neutral position relative to co-operating fluid ports during steady state operation of the governor, and an electrical solenoid device including a coil member and co-operating armature member, said members having respective co-operating pole portions which define an approximately constant air gap, one of which members is stationary and the other of which is connected to move the valve plunger axially in one direction with forces which vary according to energization of the solenoid coil when said pole portions are in a predetermined working or axial-force-exerting relationship offset from their magnetic neutral or no-axial-force-exerting relationship, said solenoid force couple constituting a self contained assembly adapted for installation and being installed into the governor as a working unit, the governor and unit assembly including means adapted to act on one of said solenoid device members for effecting minute step or high precision relative positional adjustment between the members axially of the device, one of said solenoid device members having two gauging surfaces exposed axially of the device and axially spaced apart a distance corresponding to said working axially offset relationship of the pole portions for governor operation at steady state, the other member having a co-operating gauging surface which is transversely aligned with one of said first mentioned gauging surfaces when the solenoid coil is energized prior to installation in the governor and is aligned with the other of said first mentioned gauging surfaces when said pole portions are in properly adjusted axial relationship and the governor is operating at steady state.

8. In a hydraulic speed governor for engines, wherein a fluid-servomotor-actuator pilot valve plunger is maintained in a neutral position relative to co-operating fluid ports during equilibrium operation of the governor, a solenoid device including a coil and a co-operating armature member, said coil and armature members having coacting pole portions relatively arranged to establish an approximately constant air gap, said armature member being connected to move the valve plunger axially with forces which vary according to energization of the coil when said pole portions are in an axially offset or axial-force-exerting working relative position; the improvement wherein said armature member and a stationary guiding bearing member for the armature member have a coacting pair of axially exposed gauging surface portions which are aligned in a plane transverse to the operating axis of the couple when said pole portions are in said axially offset working relative position, together with means to effect axial relative adjustment in minute steps between one element of the solenoid device and the pilot valve, so that any observed transverse misalignment of said pair of gauging surfaces during trial operation of the governor at steady state will indicate the amount and direction of adjustment necessary to co-ordinate solenoid device action with pilot valve action.

9. In a hydraulic speed governor for engines, wherein a fluid-servomotor-actuating pilot valve plunger is maintained in a neutral position relative to co-operating fluid ports during steady state operation of the governor by centrifugally acting means connected to move the plunger in one direction and a counteracting, speed setting, solenoid device including a coil and a co-operating armature member having respective co-operating pole portions, the armature member being connected through axially adjustable means to move the valve plunger in the opposite direction with forces which vary according to energization of the coil when said pole portions are in a predetermined axially offset or axial-force-exerting working relative position; the improvement wherein said armature member and a stationary guiding bearing member for the armature member have a coacting pair of axially exposed gauging surface portions which are aligned in a plane transverse to the operating axis of the device when said pole portions are in a non-working or no-axial-force-exerting relative position and a second pair of axially exposed gauging surface portions which are aligned in another transverse plane when said pole portions are in their said axially offset working relative position, whereby, after assembly of the solenoid force couple and the aforementioned governor elements, followed by trial operation of the governor at steady state, any misalignment of the second pair of gauging surfaces will indicate the amount and direction of axial relative adjustment necessary to be made between the armature and pilot valve plunger.

10. In a hydraulic speed governor for engines, wherein a servomotor-actuating pilot valve plunger is normally maintained in a neutral, non-valving position by relatively opposing axial action thereon of governor speed responsive means and remotely controllable electrically energized speed setting means, the last mentioned means comprising a stationary solenoid coil unit having annular pole portions and a co-operating armature connected to the speed responsive means for rotation thereby and movable axially to oppose the speed responsive means, said armature being of generally cylindrical form providing the co-operating pole portions which, during equilibrium operation of the governor, are offset from the coil unit pole portions a desired working distance along the armature axis, the armature having a reduced diameter journal portion at one of its ends providing an axially facing shoulder surface, a non-magnetic bearing member for the armature in fixed relationship to the coil unit and slidably embracing said journal portion of the armature, said bearing member providing an abutment for engagement with the armature shoulder surface to limit maximum displacement of the armature by the speed responsive means to such distance that the magnetic force acting on the armature does not decrease with armature displacement.

11. The mechanism according to claim 10 wherein the axially facing shoulder surface of the armature also constitutes the armature-pole-portion-defining surface which lies nearest the non-magnetic bearing member.

12. A hydraulic governor for engines, the governor having a pilot valve and a servomotor controlled thereby, wherein centrifugally responsive means and a speeder spring are respectively connected for balanced force action in opposite directions on a movable element of the pilot valve, a movable element of a variably energizable speed setting solenoid force couple is connected to apply force to the pilot valve element in the direction of action of the speeder spring thereon, and speed setting lever means are connected to act on the speeder spring in a direction to cause variation of its effective force opposing the centrifugally responsive means; characterized by provision of an adjustable stop for abutment with the lever means in various low speed setting positions of the lever means, and a biasing spring operatingly connected with the lever means and acting thereon to assist the speeder spring yieldably to maintain contact between the lever means and the stop, whereby the engines can be started at various precisely determinable low speeds without requiring energization of the solenoid force couple or operating movement of the lever means.

13. The governor according to claim 12, wherein the lever means comprises a lever member pivotally supported at one end and extending across the axis of the speeder spring and having a region between the ends of the lever operatingly in contact with the spring axially of the spring, a rockshaft crosswise of the lever adjacent an end portion thereof opposite the pivotally supported end, settable link means connecting the rockshaft with said opposite end portion of the lever and arranged to enable a given angular movement of the rock shaft to result in different speed setting movements of the lever, and the adjustable stop acts on the rockshaft to limit its angular movement.

References Cited in the file of this patent

UNITED STATES PATENTS

| | | |
|---|---|---|
| 2,219,229 | Kalin | Oct. 22, 1940 |
| 2,229,058 | Dicks | Jan. 21, 1941 |
| 2,312,212 | Edwards | Feb. 23, 1943 |
| 2,643,871 | Warrick | June 30, 1953 |